ns Patent [19]

[11] 3,841,667
[45] Oct. 15, 1974

[54] NON-TAPPING SERVICE LINE CONNECTION FITTING
[75] Inventor: Robert E. Sands, Shelbyville, Ill.
[73] Assignee: Mueller Co., Decatur, Ill.
[22] Filed: Dec. 15, 1972
[21] Appl. No.: 315,461

[52] U.S. Cl............... 285/39, 285/175, 285/192, 285/220, 285/222, 285/382.4
[51] Int. Cl............................................ F16l 55/00
[58] Field of Search ............ 285/39, 175, 192, 194, 285/197, 201, 211, 214, 220, 222, 382.4; 29/512, 523

[56] References Cited
UNITED STATES PATENTS
2,107,802  2/1938  Roach............................ 285/222 X
2,566,502  9/1951  Smith.................................. 137/15
3,638,906  2/1972  Yano............................. 285/220 X FOREIGN PATENTS OR APPLICATIONS
186,445  10/1922  Great Britain...................... 285/194
30,022  12/1911  Great Britain...................... 285/220
236,308  7/1925  Great Britain...................... 285/222

Primary Examiner—Jordan Franklin
Assistant Examiner—Moshe I. Cohen
Attorney, Agent, or Firm—Cushman, Darby & Cushman

[57] ABSTRACT

A fitting for coupling a service line to a fluid distribution pipe such as a water main or a gas main. The fitting is provided with an inlet end portion and an outlet end portion, the inlet end portion having a thread on its end separated from a second thread of opposite hand and preferably larger diameter by an intermediate smooth portion, the thread on the end threadedly carrying an expander member and the second thread threadedly carrying a saddle member arranged to fit against the exterior of the pipe. Intermediate the saddle member and the expander member there is provided a cylindrical ring which is located in the opening in the pipe when the fitting is in place and which has its interior end flared by the expander member when the body member is partially backed out of the saddle.

12 Claims, 8 Drawing Figures

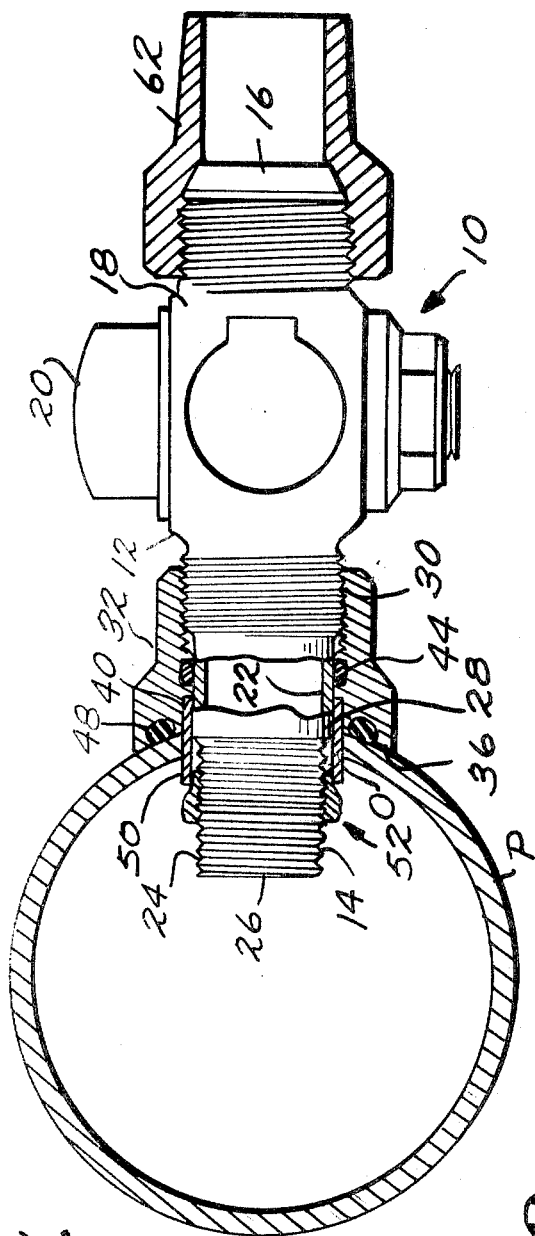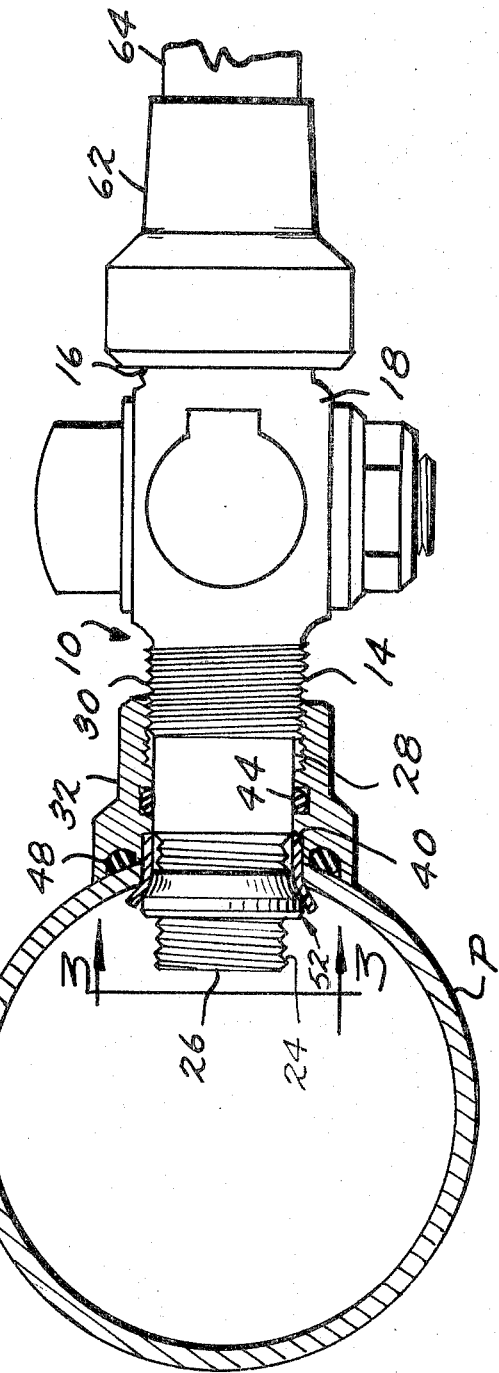
Fig. 1.
Fig. 2.

NON-TAPPING SERVICE LINE CONNECTION FITTING

The present invention relates to a fitting such as a corporation stop, elbow, tee fitting or the like used to couple or connect a service line to a water or gas main in a fluid distribution system. The pipe to which the service line is connected may be a main made of asbestos-cement, plastic material, cast iron, steel or the like.

BACKGROUND OF THE INVENTION

Fittings for connecting service lines to mains or pipes usually incorporate a valve therein and are called corporation stops. However, they may also be service tees, elbows, or straight transition fittings. In the past where such fittings have been used with cast iron or steel pipe, the inlet portion of the fitting was provided with a tapered thread which cooperated with threads in a tapped hole in the main. With the advent of plastic pipe made from polyvinyl chloride or polyethylene, or asbestos-cement pipe, holes could be tapped but this often did not result in a leak-proof connection. In view of this, efforts were made to use special saddle clamps around the pipes to receive the fittings.

In the past, efforts have been made to utilize fittings to eliminate use of clamping saddles, such fittings being provided with resilient connecting devices, lock rings, or such fittings being made of special material which can be flared when inserted in the pipe, but none of these prior efforts has proved entirely satisfactory. There is considerable prior art on these types of fittings and typical representation of such prior art is as follows:

| | | | |
|---|---|---|---|
| 698,471 | Drake | Apr. | 29, 1902 |
| 2,099,678 | Curtis | Nov. | 23, 1937 |
| 2,478,508 | Simpson | Aug. | 9, 1949 |
| 2,566,502 | Smith | Sep. | 4, 1951 |
| 3,131,953 | Windsor | May | 5, 1964 |
| 3,272,542 | Haulik et al | Sep. | 13, 1966 |

BRIEF SUMMARY OF THE INVENTION

The present invention involves a fitting which may be utilized in connecting or coupling a pipe or main made from any material to a service line of a fluid distribution system. The fitting includes a body member having an inlet portion and an outlet portion usually separated by a valve, there being a through-bore from the inlet portion to the outlet portion. The inlet portion of the body member is insertable into an opening in the main or pipe and it is provided with a first thread extending from its edge to a smooth intermediate portion and a second thread of opposite hand. The first thread receives an expander member whereas the second thread receives a saddle for sealing around the exterior of the opening in the pipe. Intermediate the first and second threads on the inlet portion of the body member is a cylindrical sleeve made of a softer material than the material of the expander member. Sleeves of different axial lengths may be used with the fitting depending upon the wall thickness of the particular main being coupled to a service line.

With the sleeve bearing against the saddle and the expander member holding the sleeve in this position, the inlet portion of the body member is inserted through the opening in the main until the saddle engages the exterior wall of the main. By holding the saddle in place against rotation and against the exterior wall of the main, the body member is rotated relative to the saddle member to back the body member partially out of the saddle, thus causing the expander member to move axially against the stationary sleeve and to flare out the end portion of the cylindrical sleeve against the interior wall of the pipe. The expander member normally will not move axially relative to or rotate on the body member when the body member is being rotated even though the expander member frictionally engages the end of the sleeve since the hand of the thread of the expander member is opposite to that of the hand of the thread of the saddle member. If there is any movement relative to the body member, this will result in a tightening action rather than unthreading action of the expander.

BRIEF DESCRIPTION OF THE DRAWINGS

FIG. 1 illustrates a portion of a main or pipe in transverse section with the fitting of the present invention being illustrated partly in longitudinal section and partly in elevation, the view depicting the initial stage of installation prior to expanding or flaring of the cylindrical sleeve.

FIG. 2 is a view similar to FIG. 1 but illustrating the fitting after the body member has been partially backed out of the saddle, the cylindrical sleeve being flared against the interior wall of the pipe.

Figure 3:
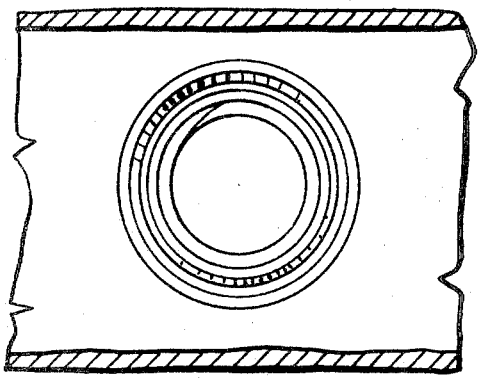
FIG. 3 is a sectional view taken on the line 3—3 of FIG. 2.
Figure 8:
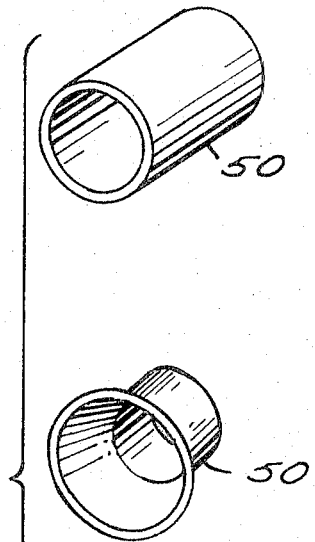
FIG. 8 is a perspective view illustrating the cylindrical sleeve before and after flaring of its end.
Figure 4:
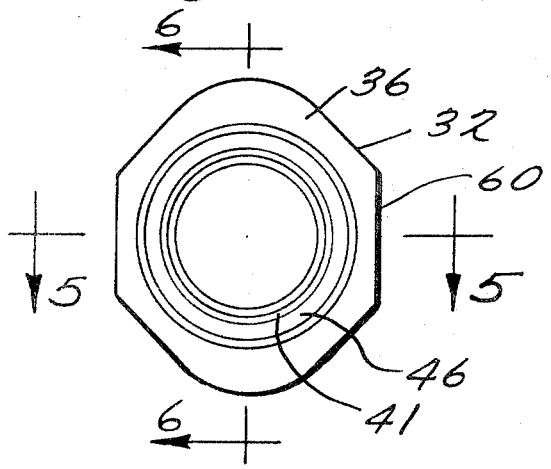
FIG. 4 is a bottom elevational view of the saddle member with the O-ring removed from its groove for the purpose of clarity.
Figure 5:
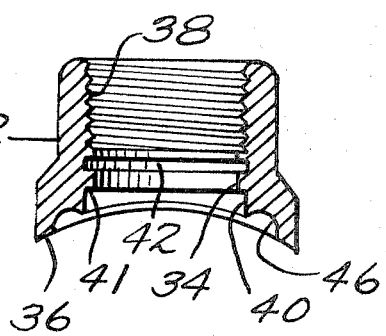
FIG. 5 is a sectional view taken on the line 5—5 of FIG. 4.
Figure 6:
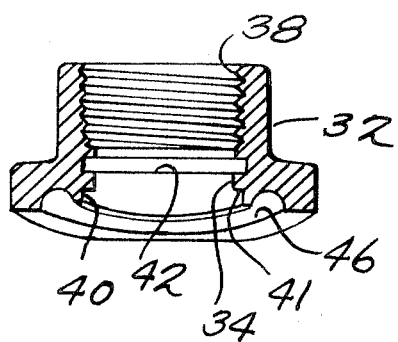
FIG. 6 is a sectional view taken on the line 6—6 of FIG. 4.

Referring now to the drawings wherein like character or reference numerals represent like or similar parts and in particular to FIGS. 1 and 2, there is disclosed a service line connection fitting generally indicated at 10, the particular fitting shown being a corporation stop. The corporation stop is preferably made of brass although other metals or plastics may be used. While the invention is being illustrated as a corporation stop, it will be appreciated by those skilled in the art the fitting 10 could be a tee, elbow, straight transition fitting or the like. The stop or fitting 10 includes a body member 12 having an inlet portion 14 and an outlet portion 16 with an intermediate center portion 18. The center portion 18 houses a valve member or key 20 whereas the inlet portion 14 and outlet portion 16 are provided with a through-bore 22.

The inlet portion 14 has a first thread 24 extending a portion of its length from its edge 26, an intermediate portion 28 having a smooth exterior and a second thread 30 extending from the intermediate portion 28 to the center portion 18 of the body member. The thread 24 has an opposite hand from the thread 30 and thus it may be a right-hand thread where thread 30 may be a left-hand thread.

As is best shown in FIGS. 1 and 4-6, a saddle member 32 having a through-bore 34 is adapted to be threadedly received on the thread 30 of the inlet portion 14. One end of the saddle 32 has a curved surface 36 complementary to the portion of exterior surface of the pipe about the opening O in the pipe P. The opposite end of the through-bore 34 spaced from the surface 36 is provided with an interior thread 38 for cooperating with the thread 30 of the inlet portion 14. A counter bore 40 is provided adjacent the surface 36 and surrounds the bore 34, the counter bore at its inner end defining an annular shoulder 41. An annular groove 42 is provided in the bore 34 (FIG. 5) for receiving an O-ring 44 (FIG. 1) or other suitable seal whereas an annular groove 46 (FIG. 4) is provided on the surface 36 for receiving an O-ring 48 (FIG. 1) or other suitable seal.

Figure 7:
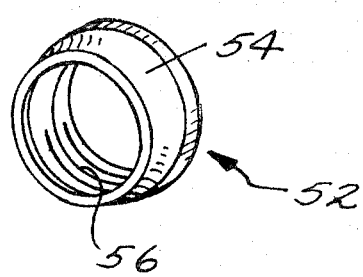
FIG. 7 is a perspective view of the expander member.

As will be noted by reference to FIGS. 1 and 2, the diameter of the intermediate portion 28 of the inlet portion 14 is less than the diameter of the opening O in the pipe P and also the diameter of the counter bore 40 so that there is an annular space therebetween for receiving the end of a cylindrical sleeve 50 which abuts against the annular shoulder 41. Further, it will be noted that the thread 24 is of slightly less diameter than the interior diameter of the cylindrical sleeve and this thread receives an expander ring or member 52. Referring now to FIG. 7, the expander member 52 has a frusto-conical camming or flaring surface 54 which is concave in radial section. The maximum diameter of the expander member 52 is less than the diameter of the opening O but greater than the interior diameter of the sleeve member 50 whereas the smallest exterior diameter of the expander ring is just small enough to fit slightly within the end of the cylindrical sleeve 50. The expander member 52 has interior threads 56 for cooperating with the exterior thread 24 and when the fitting is assembled prior to connecting to the pipe P, the expander member is threaded onto the inlet portion 14 until it engages the inner end of the sleeve 50 and then moves the sleeve in abutting relationship with the annular shoulder 41, thus locking the sleeve 50 between the expander member 52 and the saddle 32. The axial length of the sleeve 50 is dependent upon the thickness of the pipe P and thus the fitting 10 may be used with pipes of different wall thickness merely by changing one element, namely, the cylindrical sleeve 50.

With the various elements of the fitting assembled as described above, the fitting 10 is then ready for attaching to the pipe P and this is accomplished by inserting the inlet portion 14 through the opening O in the pipe P until the surface 36 of the saddle 32 engages the exterior surface of the pipe P as shown in FIG. 1. As will be noted in FIG. 4, the saddle 32 is provided with two oppositely disposed flat sides 60 for receiving a wrench or the like. While holding the saddle 32 tightly against the pipe P and against rotation, the body member 12 is rotated to back the same partially out of the saddle member and this will cause the expander ring or member 52 to engage on its camming or flaring surface 54 and flare outwardly the inner end of the sleeve 50 against the interior wall surface of the pipe P as shown in FIG. 2. Although there is rotative movement of the entire body member 12, there will be no unthreading action of the expander member 52 as it has an opposite thread from that of the saddle 32 and thus it could not be backed off of the end of the inlet portion 14. As shown in FIG. 2 the concaved frusto-conical camming surface 54 smoothly flares the sleeve outwardly with a minimum of torque and gives the same a sharper bend.

While the body member 12 of the fitting is preferably made of brass, it may also be made of other metals or hard plastics. Additionally, the saddle 32 and the expander member 52 are preferably made of brass while the cylindrical sleeve 50 is made of a softer material such as annealed copper. Of course these elements may be made of other materials so long as the relationship between the hardness of the expander member and the sleeve is maintained.

In FIG. 1 there is shown a coupling nut 62 threadedly mounted on the outlet portion 16 of the body member 12. Once the fitting 10 has been attached to the pipe P as shown in FIG. 2, the coupling nut 62 is removed and inserted onto the end of a service line 64, the service line then having its end flared in the usual manner. Coupling nut 62 is then rethreaded back onto the fitting to complete the hook-up of the system.

The terminology used throughout the specification is for the purpose of description and not limitation, the fitting of the invention being defined by the claims.

What is claimed is:

1. A fitting for coupling a service line to a fluid distribution pipe having an opening therein, said fitting comprising a body member having an inlet portion with an end for insertion into the opening in said pipe and an outlet portion for connection to the service line, said body member having a flow passage extending therethrough between said inlet portion and said outlet portion, a saddle member having a bore therethrough and having an end surface surrounding said bore which is complementary to the exterior surface of the pipe surrounding the opening therein, said saddle member being carried on said inlet portion for relative movement axially thereof, a counter bore in the end surface of said saddle member, a cylindrical sleeve having an exterior diameter less than the diameter of the opening in the pipe and arranged to be received in said counter bore, and expander means carried on the end of said inlet portion of said body member for flaring said sleeve outwardly when said inlet portion is moved axially outwardly of said saddle member, said expander means being adjustably carried on said inlet portion, said expander means being a frusto-conical ring threadedly carried on the end of said inlet portion and having a maximum diameter greater than the interior diameter of said sleeve but less than the diameter of the opening in said pipe.

2. A fitting as claimed in claim 1 in which said saddle member is threadedly carried on said inlet portion for the axial movement relative thereto.

3. A fitting as claimed in claim 2 in which said saddle member has a thread of opposite hand to a thread of said expander ring.

4. A fitting as claimed in claim 3 including a first sealing means carried on the surface of said saddle member complementary to the exterior surface of said pipe for sealing between the same and the pipe and a second sealing means for sealing between the saddle member and said inlet portion of said body member.

5. A fitting for coupling a service line to a fluid distribution pipe having an opening therein, said fitting comprising: a body member having an inlet portion with an end for insertion into the opening in said pipe and an outlet portion for connection to the service line, said body member having a flow passage extending therethrough between said inlet portion and said outlet portion, said inlet portion having a first thread extending from adjacent its edge along a portion of its length and said first thread having a diameter less than the diameter of said opening, an intermediate unthreaded portion also of a diameter less than the diameter of said opening, and a second thread extending from said intermediate portion along another portion of the inlet end portion, said second thread being of opposite hand to said first thread, a saddle member having a bore therethrough with a thread at one end thereof complementary to said second thread, said saddle member having its opposite end provided with a surface complementary to the exterior surface of said pipe and being larger than said opening, a cylindrical bushing slidable on the end of said inlet portion and having an exterior diameter to permit the same to be inserted through said opening, and an annular expander member having an interior thread complementary to said first thread and having a maximum outside diameter no greater than the diameter of said opening but greater than an interior diameter of said bushing, said expander member being capable of expanding an end of said bushing within said pipe when said body member is partially backed out of said saddle member with said saddle member bearing against said pipe.

6. A fitting as claimed in claim 5 including sealing means carried in a groove in the opposite end surface of said saddle member for bearing against the exterior of said pipe around said hole.

7. A fitting as in claim 6 including a second sealing means carried by said saddle member for sealing between said saddle member and the intermediate unthreaded portion of the inlet portion.

8. A fitting as claimed in claim 5 wherein said annular expander member has a frusto-conical expanding surface for engaging the interior of said bushing.

9. A fitting as claimed in claim 8 wherein said frusto-conical expanding surface is concave in radial section of said expander member.

10. A fitting as claimed in claim 5 including a counter bore in the end of the saddle member abutting the pipe, said counter bore receiving a portion of said bushing and preventing movement of the bushing axially of the saddle member when said body member is partially backed out of saddle member to expand the inner end of the bushing.

11. A fitting as claimed in claim 5 in which said bushing is made of a softer material than said expander member and in which said second thread on said inlet end portion has a greater diameter than said first thread.

12. A fitting as claimed in claim 5 in which said saddle member is provided in its exterior with wrench-engaging surfaces whereby it may be held snugly against the pipe when said body member is being withdrawn partially therefrom.

* * * * *